US011203393B2

(12) United States Patent
Woo et al.

(10) Patent No.: US 11,203,393 B2
(45) Date of Patent: Dec. 21, 2021

(54) PERSONAL MOBILITY DEVICE AND METHOD FOR CONTROLLING A PERSONAL MOBILITY DEVICE

(71) Applicants: Hyundai Motor Company, Seoul (KR); Kia Motors Corporation, Seoul (KR)

(72) Inventors: Seunghyun Woo, Seoul (KR); Minjae Park, Gyeonggi-do (KR); Jong Bok Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/060,451

(22) Filed: Oct. 1, 2020

(65) Prior Publication Data
US 2021/0300502 A1     Sep. 30, 2021

(30) Foreign Application Priority Data

Mar. 25, 2020 (KR) .......................... 10-2020-0036356

(51) Int. Cl.
| B62K 23/02 | (2006.01) |
| B62K 11/14 | (2006.01) |
| B62L 3/02 | (2006.01) |
| B62K 23/04 | (2006.01) |

(52) U.S. Cl.
CPC .............. *B62K 23/04* (2013.01); *B62K 11/14* (2013.01); *B62L 3/02* (2013.01)

(58) Field of Classification Search
CPC ........ B62K 11/14; B62K 23/02; B62K 23/04; B62K 2202/00; B62K 2204/00; B62L 3/02; B62L 3/026
See application file for complete search history.

(56) References Cited

U.S. PATENT DOCUMENTS

| 8,922,201 B2 * | 12/2014 | Iwahashi | ................ G01D 5/145 324/207.2 |
| 10,900,769 B2 * | 1/2021 | Kishi | ...................... F02D 11/02 |

FOREIGN PATENT DOCUMENTS

EP             2746142 A1 *  6/2014   ............. B62K 23/04

* cited by examiner

*Primary Examiner* — Adam D Rogers
(74) *Attorney, Agent, or Firm* — Mintz Levin Cohn Ferris Glovsky and Popeo, P.C.; Peter F. Corless

(57) ABSTRACT

A personal mobility and a controlling method adjusting speed based on shape information of the handle are provided. The personal mobility includes a power device, a braking device, and a handle. The handle includes a plurality of axes provided to be movable and a deformable cover surrounding the plurality of axes. A detector detects movement of each of the plurality of axes and a controller operates the power device and the braking device based on a positional relationship between the plurality of axes according to the movement of each of the plurality of axes.

20 Claims, 8 Drawing Sheets

| DRIVING CONTROL | LEFT HANDLE | | RIGHT HANDLE | |
|---|---|---|---|---|
| ACCELERATION | 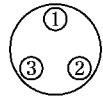 | REFERENCE POSITION |  | GATHERING IN DRIVING DIRECTION |
| FAST ACCELERATION |  | GATHERING IN DRIVING DIRECTION |  | GATHERING IN DRIVING DIRECTION |
| DECELERATION | 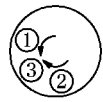 | GATHERING IN OPPOSITE DIRECTION OF DRIVING | 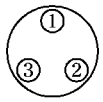 | REFERENCE POSITION |
| FAST DECELERATION |  | GATHERING IN OPPOSITE DIRECTION OF DRIVING | 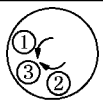 | GATHERING IN OPPOSITE DIRECTION OF DRIVING |

FIG. 7
| CONDITION INFORMATION | LEFT HANDLE | RIGHT HANDLE |
|---|---|---|
| ERROR ST CONDITION/ BATTERY UNAVAILABLE |  GATHERING TOWARDS NO. 1 |  GATHERING TOWARDS NO. 1 |

PERSONAL MOBILITY DEVICE AND METHOD FOR CONTROLLING A PERSONAL MOBILITY DEVICE

CROSS-REFERENCE TO RELATED APPLICATION(S)

This application is based on and claims priority under 35 U.S.C. § 119 to Korean Patent Application No. 10-2020-0036356, filed on Mar. 25, 2020 the disclosure of which is incorporated by reference in its entirety.

BACKGROUND

1. Technical Field

The present disclosure relates to a personal mobility having a handle and more particularly, to a personal mobility that is able to adjust speed based on shape information of handle and a controlling method thereof.

2. Description of the Related Art

Recently, as the market for personal mobility corresponding to a small mobility means powered by electricity expands, the number of users using personal mobility has increased. In general, a user must grip the handle of the personal mobility to board the personal mobility, and must perform the operation for driving in a situation where the handle is gripped. At this time, the user can stare at the operating system for manipulation, and the risk of an accident may increase if the operator does not look forward due to gazing at the operating system.

SUMMARY

In view of the above, an aspect of the present disclosure provides a personal mobility that is able to adjust speed based on shape information of handle and a controlling method thereof.

In accordance with an aspect of the present disclosure, a personal mobility may include a power device; a braking device; a handle including a plurality of axes provided to be movable and a deformable cover surrounding the plurality of axes; a detector configured to detect movement of each of the plurality of axes; and a controller configured to operate the power device and the braking device based on a positional relationship between the plurality of axes according to the movement of each of the plurality of axes.

The controller may be configured to operate the power device to increase a speed when the plurality of axes gather toward a driving direction based on a central axis of the handle according to the movement of each of the plurality of axes. The controller may be configured to operate the braking device to decrease a speed when the plurality of axes gather toward an opposite direction of a driving direction based on a central axis of the handle according to the movement of each of the plurality of axes. Additionally, the controller may be configured to determine a magnitude of acceleration in proportion to a degree of proximity between the plurality of axes.

The handle may include a left handle and a right handle, and the controller may be configured to determine a first acceleration based on a positional relationship between the plurality of axes in the left handle, determine a second acceleration based on the positional relationship between the plurality of axes in the right handle, and operate the power device or the braking device based on a sum of the first acceleration and the second acceleration. The personal mobility may further include a plurality of actuators that correspond to each of the plurality of axes.

The controller may be configured to operate the at least one actuators that corresponds to the at least one axes to provide a force in a direction opposite to the movement direction of the at least one axis when the at least one axis of the plurality of axes moves based on a physical force from the user. The controller may further be configured to operate the at least one actuators that corresponds to the at least one axes so that the at least one axes return to a reference position when at least one of the plurality of axes moves.

Additionally, the controller may be configured to operate the plurality of actuators such that the plurality of axes moves to a position corresponding to state information. The handle may include a pair of support members that support the plurality of axes and are provided with a plurality of movable rails corresponding to each of the plurality of axes; and each of the plurality of actuators may be connected to the corresponding moving rail among the plurality of moving rails.

In accordance with an aspect of the present disclosure, a control method of a personal mobility including a power device, a braking device and a handle, the method may include detecting a movement of each of a plurality of axes included in the handle and provided to be movable; operating the power device and the braking device based on a positional relationship between the plurality of axes according to the movement of each of the plurality of axes.

The operating of the power device or the braking device may include: operating the power device to increase a speed when the plurality of axes gather toward a driving direction based on a central axis of the handle according to the movement of each of the plurality of axes. Additionally, the operating of the power device or the braking device may include: operating the braking device to decrease a speed when the plurality of axes gather toward an opposite direction of a driving direction based on a central axis of the handle according to the movement of each of the plurality of axes. The operating of the power device or the braking device may include: determining a magnitude of acceleration in proportion to a degree of proximity between the plurality of axes.

The handle may include a left handle and a right handle, and the method may further include: determining a first acceleration based on a positional relationship between the plurality of axes in the left handle, determining a second acceleration based on the positional relationship between the plurality of axes in the right handle, and operating the power device or the braking device based on a sum of the first acceleration and the second acceleration. The personal mobility may further include a plurality of actuators corresponding to each of the plurality of axes.

The method may further include operating the at least one actuators that corresponds to the at least one axes to provide a force in a direction opposite to the movement direction of the at least one axis when the at least one axis of the plurality of axes moves based on a physical force from the user. The method may further include operating the at least one actuators that corresponds to the at least one axes so that the at least one axes return to a reference position when at least one of the plurality of axes moves.

The method may further include operating the plurality of actuators such that the plurality of axes moves to a position corresponding to state information. The handle may include a pair of support members that support the plurality of axes and are provided with a plurality of moving rails corresponding to each of the plurality of axes; and wherein each of the plurality of actuators may be connected to the corresponding moving rail among the plurality of moving rails.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 5 is a diagram illustrating a case in which personal mobility according to an exemplary embodiment controls driving in consideration of each of the left and right handles.

FIG. 7 is a diagram illustrating an example in the case where a personal mobility according to an exemplary embodiment moves an axis in response to status information.

DETAILED DESCRIPTION

Figure 1:
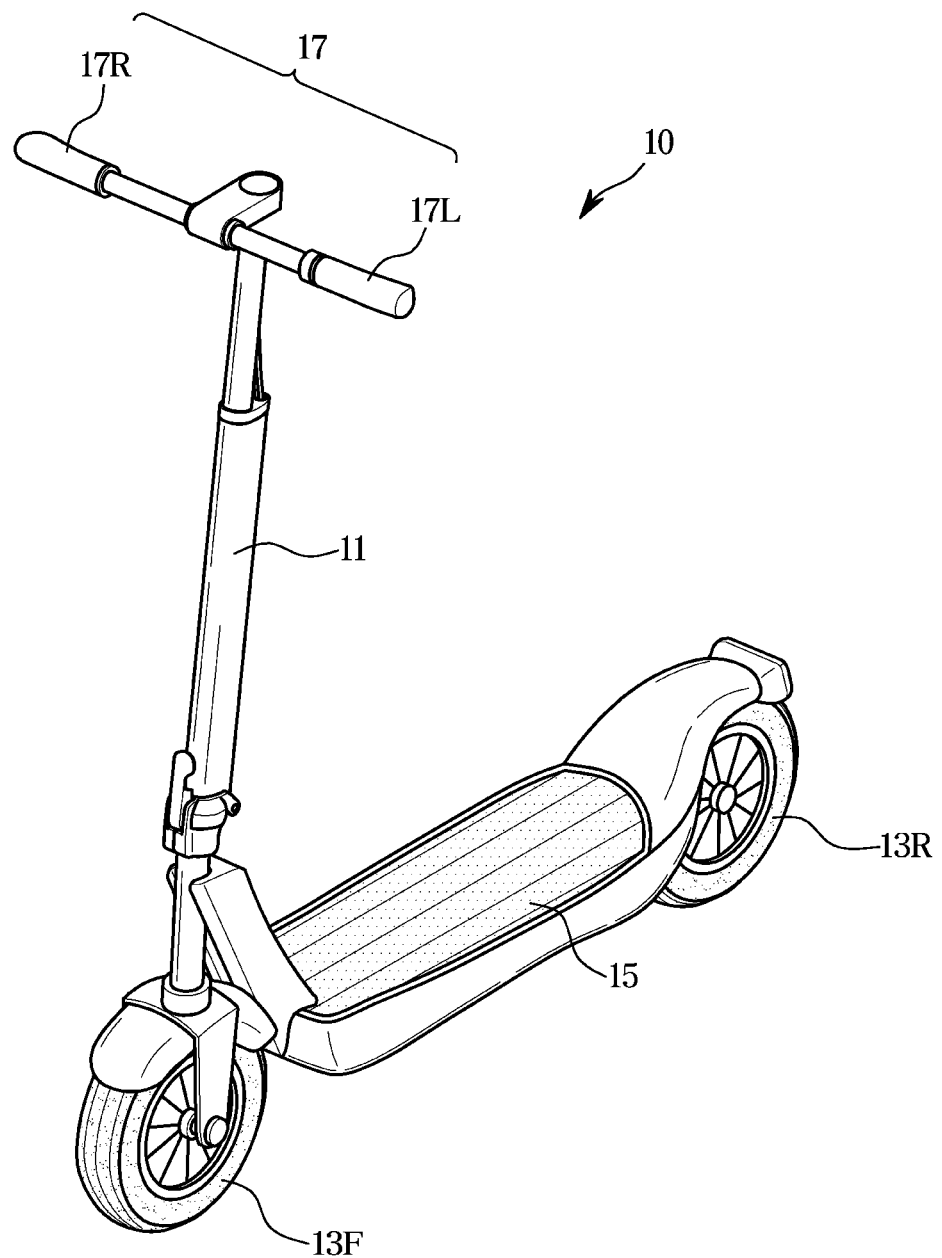
FIG. 1 is an external diagram of personal mobility according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout. The present disclosure does not describe all elements of the exemplary embodiments, and overlaps between the general contents or the embodiments in the technical field to which the present invention belongs.

This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network. In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members. The terms first, second, etc. are used to distinguish one component from another component, and the component is not limited by the terms described above. Singular expressions include plural expressions unless the context clearly indicates an exception. In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and exemplary embodiments of the present invention. FIG. 1 is an external diagram of personal mobility according to an exemplary embodiment. Personal mobility according to an exemplary embodiment refers to a small mobility for one person or two persons capable of driving with electric power such as an electric kickboard, an electric bicycle, and an electric wheel. For a detailed description, in the exemplary embodiment described below, a case in which personal mobility is an electric kickboard will be described as an example.

Referring to FIG. 1, personal mobility 10 may include body 11, the handle 17 provided on the top of the body 11 (e.g., left handle 17L and right handle 17R), the front wheel 13F provided at the bottom of the body 11, a footrest 15 that extends rearward of the front wheel 13F from the bottom of the body 11, and a rear wheel 13R provided on the rear of the footrest 15. The user of the personal mobility 10 may stand on the footrest 15 and drive while holding the left handle 17L and the right handle 17R, and may adjust the driving direction by operating the left handle 17L and the right handle 17R.

In addition, the user of the personal mobility 10 may adjust the speed by applying a physical force to the handle 17, such as pushing the handle 17 in the driving direction or pulling in the opposite direction of the driving direction. In other words, the handle 17, the shape may be deformed based on the physical force of the user, and the personal mobility 10 may adjust the speed based on the shape deformation of the handle 17. Accordingly, the handle 17 may be provided with a special structure.

Figure 2:
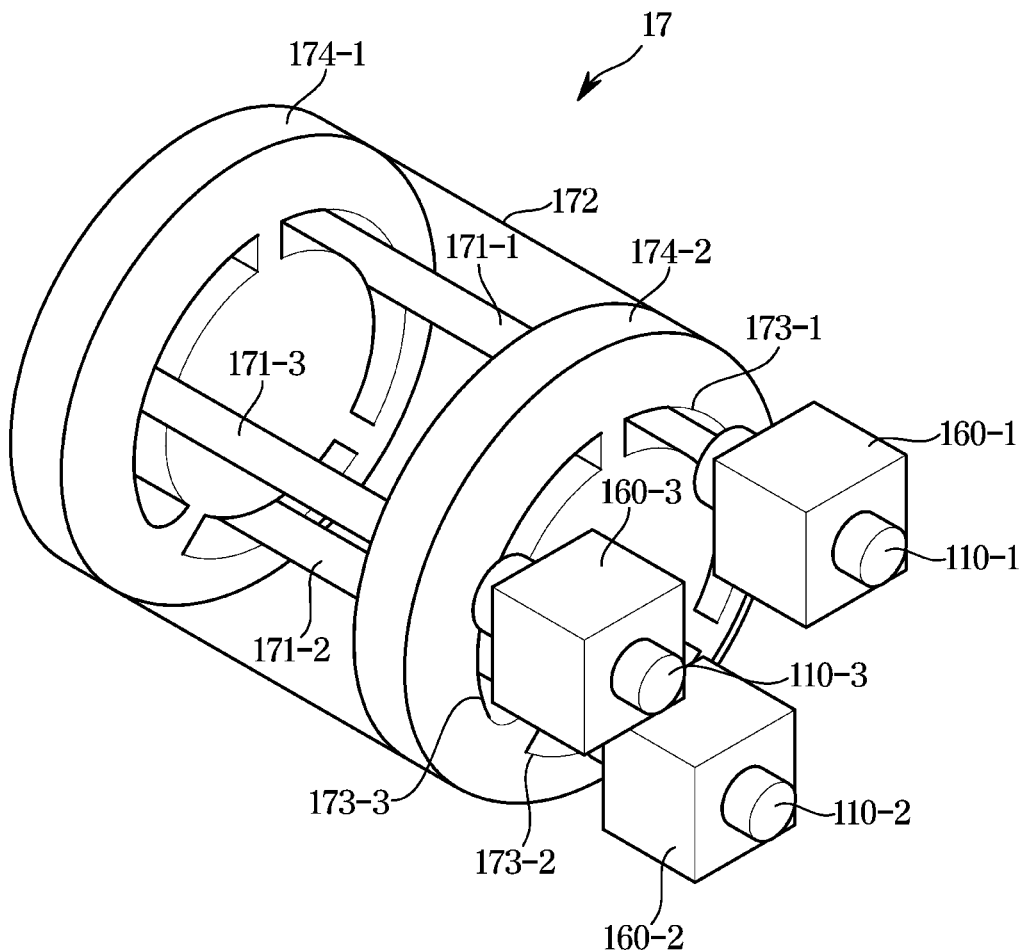
FIG. 2 is a perspective diagram of a handle according to an exemplary embodiment.

FIG. 2 is a perspective diagram of a handle according to an exemplary embodiment. Referring to FIG. 2, the handle 17 according to an exemplary embodiment may include a plurality of axes 171 that are provided to be movable, and a deformable cover 172 that surrounds or encloses the plurality of axes 171. The handle 17 may include a pair of support members 174 that support a plurality of shafts 171 and may include a plurality of moving rails 173 that corresponds to each of the plurality of shafts 171.

The plurality of shafts 171 may extend in the direction of the long axis of the handle 17, the shafts 171 may each include a first end connected to any one of the pair of support members 174 and a second end connected to the other support member 174-2 of the pair of support members 174. At this time, each of the plurality of axes 171 may move along a corresponding moving rail 173, and a physical force from a user or a physical force from the actuator 160 connected to the moving rail 173 may be applied. At this time, one side of the support member 174 may be provided with a sensing unit 110 configured to detect the movement of each of the plurality of moving rails 173.

For example, the plurality of shafts 171, as shown in FIG. 2, includes three axes, such as the first axis 171-1, the second axis 171-2 and the third axis 171-3, and a plurality of moving rails 173-1, 173-2, 173-3; 173 corresponding to each of the plurality of axes 171-1, 171-2, 171-3; 171, and a plurality of actuators 160-1, 160-2, 160-3; 160, and a plurality of detector 110-1, 110-2, 110-3; 110. The number of axes included in the plurality of axes 171 is not limited as long as three or more. Hereinafter, for convenience of description, it will be described as an example that the plurality of axes 171 include three axes.

The plurality of shafts 171 may be disposed in a regular polygonal shape corresponding to the number of axes included when the force is not received from the outside, the position of each axis 171 at this time may be set as a reference position of the corresponding axis 171. Accordingly, the handle 17 may include a plurality of shafts 171 which are provided to be movable according to a force applied from the outside, the personal mobility 10 may adjust the traveling speed based on the positional relationship between the plurality of axes 171 according to the movement of each of the plurality of axes 171. Hereinafter, the personal mobility 10 will be described in detail with respect to adjusting the speed based on the shape change of the handle 17.

The deformable cover 172 may surround or enclose the plurality of shafts 171 with a cylindrical elastic body, and the elastic body inside may be deformed according to the movement of the plurality of shafts 171. The plurality of moving rails 173 may be provided in a curved shape along the outer surface of the handle 17. For example, each of the plurality of moving rails 173 may be provided in a curve shape of curvature corresponding to the curvature of the outer surface of the handle 17.

Figure 3:
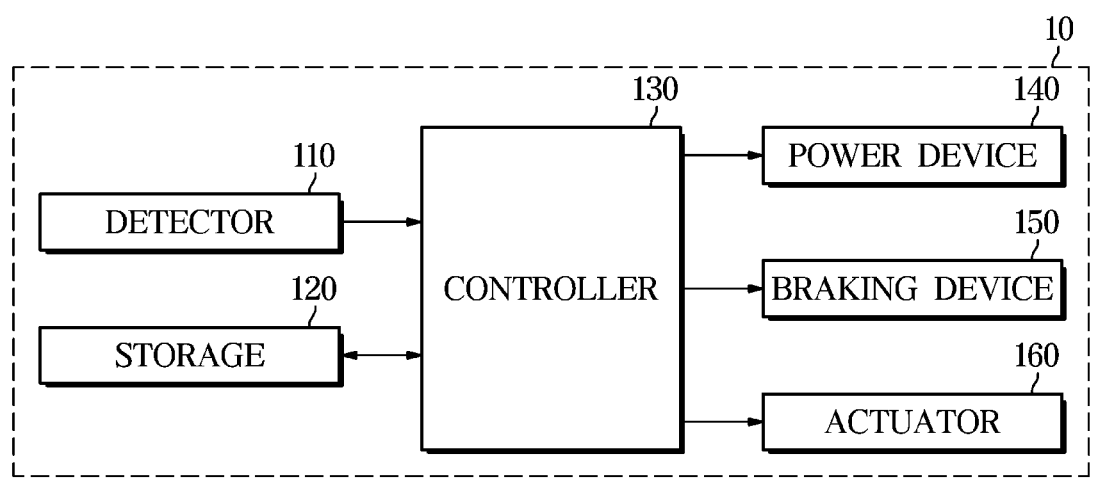
FIG. 3 is a control block diagram of personal mobility according to an exemplary embodiment.

FIG. 3 is a control block diagram of personal mobility according to an exemplary embodiment. Referring to FIG. 3, the personal mobility 10 according to an exemplary embodiment may include a detector 110 configured to sense the movement of each of the plurality of shafts 171 of the handle 17, a storage 120 configured to store various information necessary for operation, a controller 130 configured to adjust the speed based on the shape change of the handle 17, a power device 140 configured to transmit power to at least one of the front wheel 13F or rear wheel 13R, a braking device 150 for braking at least one of the front wheel 13F or the rear wheel 13R, and an actuator 160 configured to move a plurality of axes 171.

The detector 110 according to an exemplary embodiment may be configured to detect movement of each of the plurality of axes 171. Accordingly, a plurality of pieces may be provided to correspond to each axis 171, and by detecting the movement of the corresponding moving rail 173, the movement of the axis 171 connected to the moving rail 173 may be detected. The detector 110 may be provided with a rotary encoder that is directly connected to the moving rail 173 and may be configured to measure a rotation angle and a rotation angle of the rotor as the moving rail 173 moves, according to an exemplary embodiment. Further, the detector 110 may be provided as a rotary encoder that is connected to the moving rail 173 and configured to measure the rotation angle of the actuator 160 rotating according to the movement of the moving rail 173.

The storage 120 according to an exemplary embodiment may be configured to store various information necessary for operation, such as control contents corresponding to a positional relationship between the plurality of axes 171, and may include a storage medium of a known type. The controller 130 according to an exemplary embodiment may be configured to adjust the driving speed by operating the power device 140 or the braking device 150 based on the positional relationship between the plurality of axes 171 according to the movement of each of the plurality of axes 171.

Specifically, when the plurality of axes 171 are moved toward the driving direction based on the central axis in the long axis direction of the handle 17 according to the movement of each of the plurality of axes 171, the controller 130 may be configured to operate the power device 140 to increase the speed. In addition, when the plurality of axes 171 are moved in accordance with the movement of each of the plurality of axes 171 toward the opposite direction of the driving direction based on the central axis in the long axis direction of the handle 17, the controller 130 may be configured to operate the braking device 150 to decrease the speed.

At this time, the controller 130 may be configured to determine the magnitude of acceleration in proportion to the degree of proximity between the plurality of axes 171. In other words, when a plurality of axes 171, which are in a regular polygon and are located at a reference position apart from each other, are gathered together by the force transmitted from the user, the controller 130 may be configured to determine the magnitude of the acceleration by determining that the higher the degree of proximity is, the greater the force received from the user, and may be configured to operate the power device 140 or the braking device 150 to increase or decrease the speed with the determined magnitude of acceleration.

According to an exemplary embodiment, the controller may be configured to determine the first acceleration based on the positional relationship between the plurality of axes 171 in the left handle 17L, and determine the second acceleration based on the positional relationship between the plurality of axes 171 in the right hand handle 17R, and operate the power device 140 or the braking device 150 by determining the final acceleration based on the sum of the first acceleration and the second acceleration to drive at the final acceleration.

According to an exemplary embodiment, when at least one of the plurality of axes 171 moves based on a physical force from the user, the controller 130 may be configured to operate at least one actuator 160 that corresponds to the at least one axis to provide a force in a direction opposite to the movement direction of the at least one axis. In other words, the controller 130 may be configured to operate the actuator 160 to provide force in a direction opposite to the direction of the force applied by the user to the axis 171, thereby preventing the user from inadvertently moving the sudden axis 171 to rapidly change the speed.

According to an exemplary embodiment, when at least one of the plurality of axes 171 moves, the controller 130 may be configured to operate at least one actuator 160 that corresponds to the at least one axis to return the at least one axis to the reference position. In other words, when the plurality of axes 171 is moved based on the force from the user, the force from the user is no longer applied, the controller 130 may be configured to operate the actuator 160 to cause each of the plurality of axes 171 to return to the reference position again.

The controller 130 according to an exemplary embodiment may be configured to operate the actuator 160 to move each of the plurality of axes 171 to a position corresponding to status information. In other words, the controller 130 may be configured to move the plurality of axes 171 to have a positional relationship corresponding to the status information, and thus, information may be transmitted to the user through shape modification of the handle 17. Through this, even if the user does not stare or look directly at a separate display system, information may be transmitted through the handle 17, and the risk of an accident may be reduced.

The controller 130 may include at least one memory in which a program for performing the above-described operations and operations described below is stored, and at least one processor for executing the stored program. In the case of a plurality of memory and processors, it is possible that they are integrated in one chip, and it is also possible to be provided in a physically separate location. Further, the power device 140 according to an exemplary embodiment may be configured to transmit power to at least one of the front wheel 13F or the rear wheel 13R, to allow the personal mobility 10 to travel. In other words, the power device 140 may be configured to transmit power to the wheels under the operate of the controller 130. At this time, the power device 140 may correspond to a motor driven by electricity.

The braking device 150 according to an exemplary embodiment may be configured to decelerate the personal mobility 10 by braking at least one of the front wheel 13F or the rear wheel 13R. In other words, the braking device 150 may provide a wheel under the operate of the controller 130, and a brake device of a known type may be used. A plurality of actuators 160 according to an exemplary embodiment may be provided to correspond to each of the plurality of shafts 171, each actuator 160 may move the plurality of axes 171 by transmitting power to the moving rail 173 to which the plurality of axes 171 are connected. Accordingly, the actuator 160 may be connected to the moving rail 173 through a separate gear (not shown), and may correspond to a motor driven by electricity.

Figure 4:
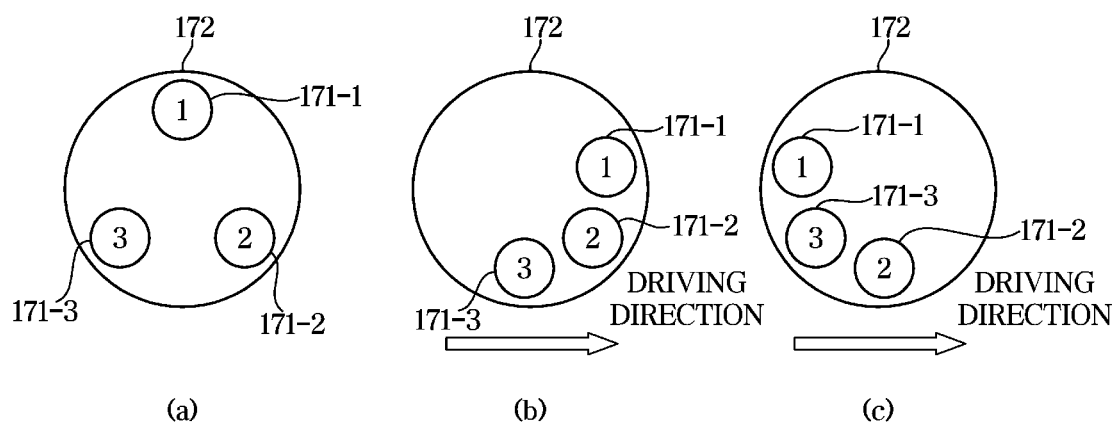
FIGS. 4A-4C are diagrams illustrating a positional relationship between a plurality of axes of a handle according to an exemplary embodiment.

In the above, the configuration of the personal mobility 10 has been described in detail. Hereinafter, the personal mobility 10 will be described in more detail with respect to adjusting the speed based on the shape change of the handle 17. FIG. 4 is a diagram illustrating a positional relationship between a plurality of axes 171 of a handle 17 according to an exemplary embodiment.

Referring to FIGS. 4A-4C, the plurality of shafts 171 of the handle 17 according to an exemplary embodiment may be disposed in a regular polygonal shape that corresponds to the number of axes included when not receiving a force from the outside. The position of each axis 171 may be set as a reference position of the corresponding axis 171. For example, the plurality of axes 171, as shown in FIG. 4A, the first axis 171-1, the second axis 171-2 and the third axis 171-3 are may be included, the first axis 171-1, the second axis 171-2, and the third axis 171-3 may be arranged in an equilateral triangle.

Specifically, the first axis 171-1 may be disposed at the upper end from the central axis C in the long axis direction of the handle 17, the second shaft 171-2 may be disposed in the driving direction from the central axis C in the long axis direction of the handle 17, and the third shaft 171-3 may be disposed in a direction opposite to the driving direction from the central axis C in the long axis direction of the handle 17. At this time, when the user applies a physical force to the plurality of axes 171 in the driving direction of the personal mobility 10, the plurality of shafts 171 may be gathered toward the driving direction based on the central axis C in the long axis direction of the handle 17, as shown in FIG. 4B.

For example, the first axis 171-1 and the third axis 171-3 move to approach the second axis 171-2 located in the driving direction from the central axis C in the long axis direction of the handle 17. Thus, the first axis 171-1, the second axis 171-2 and the third axis 171-3 may be gathered toward the driving direction with respect to the central axis (C) in the long axis direction of the handle 17. In addition, when the user applies a physical force to the plurality of axes 171 in a direction opposite to the driving direction of the personal mobility 10, the plurality of shafts 171 may be gathered toward the opposite direction of the driving direction based on the central axis C in the long axis direction of the handle 17, as shown in FIG. 4C.

For example, the first axis 171-1 and the second axis 171-2 move to approach the third axis 171-3 disposed in the opposite direction of driving direction from the central axis C in the long axis direction of the handle 17. Thus, the first axis 171-1, the second axis 171-2 and the third axis 171-3 may be gathered toward the opposite direction of driving direction with respect to the central axis (C) in the long axis direction of the handle 17. The controller 130 according to an exemplary embodiment may be configured to adjust the driving speed by operating the power device 140 or the braking device 150 based on the positional relationship between the plurality of axes 171 according to the movement of each of the plurality of axes 171.

In particular, the controller 130 may be configured to operate the power device 140 to increase speed based on the central axis (C) in the long axis direction of the handle 17, as shown in FIG. 4B, in the case of gathering toward the driving direction. Additionally, the controller 130 may be configured to operate the braking device 150 to decrease speed based on the central axis C in the long axis direction of the handle 17, as shown in FIG. 4C, in the case of gathering toward the opposite direction of the driving direction.

At this time, the controller 130 may be configured to determine the magnitude of acceleration in proportion to the degree of proximity between the plurality of axes 171. In other words, when a plurality of axes 171 that are located at a reference position apart from each other forming a regular polygon are gathered with each other by a force transmitted from a user, the controller 130 may be configured to determine the greater the amount of acceleration by determining that the higher the degree of proximity, the greater the force received from the user. Additionally, the the controller 130 may be configured to operate the power device 140 or the braking device 150 to increase or decrease the speed with the determined magnitude of acceleration.

FIG. 5 is a diagram illustrating a case in which the personal mobility 10 according to an exemplary embodiment controls driving by considering each of the left handle 17L and the right handle 17R. The controller 130 according to an exemplary embodiment may be configured to determine the first acceleration based on the positional relationship between the plurality of axes 171 in the left handle 17L, and determine the second acceleration based on the positional relationship between the plurality of axes 171 in the right hand handle 17R, and operate the power device 140 or the braking device 150 to determine the final acceleration based on the sum of the first acceleration and the second acceleration to drive at the final acceleration.

For example, the controller 130 may be configured to determine a higher amount of acceleration than when one of the handles (e.g., the left handle (17L) or the right handle (17R)) converges in the driving direction, thus operating the power device 140 to provide rapid acceleration when the shaft 171 converges in the driving direction from both the left handle 17L and the right handle 17R as shown in FIG. 5. Additionally, the controller 130 may be configured to determine a higher amount of deceleration than when one of the handles (e.g., the left handle (17L) or the right handle (17R)) converges in the opposite direction of the driving direction, thus operating the braking device 150 to provide rapid acceleration when the shaft 171 converges in the opposite direction of driving direction from both the left handle 17L and the right handle 17R as shown in FIG. 5.

However, the example of determining the final acceleration by determining the acceleration from each of the left handle 17L and the right handle 17R is not limited to the example shown in FIG. 5. It may include various exemplary embodiments in which the accelerations in each of the left handle 17L and the right handle 17R are independently determined, such as positive acceleration in one handle and negative acceleration in the other handle.

Figure 6:
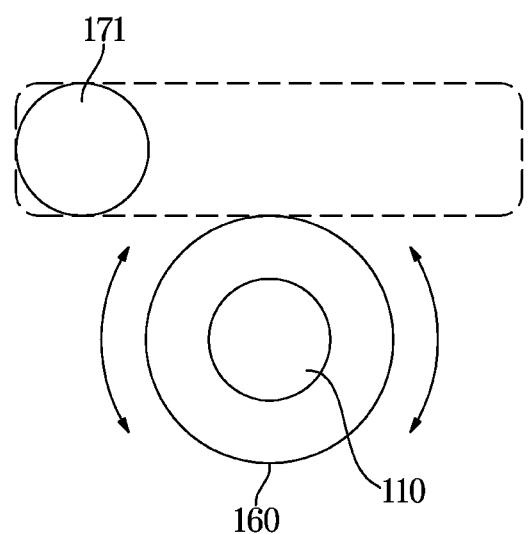
FIG. 6 is a diagram for explaining a case in which the actuator according to an exemplary embodiment moves the axis.

FIG. 6 is a diagram for explaining a case in which the actuator 160 according to an exemplary embodiment moves the axis 171. Referring to FIG. 6, the actuator 160 may be connected to the moving rail 173 through a separate gear (not shown), and may be configured to transmit power to the moving rail 173 to which the shaft 171 is connected. Accordingly, when the actuator 160 transmits power to the moving rail 173, the moving rail 173 moves, and the axis 171 connected to the moving rail 173 may move together with the moving rail 173.

At this time, the detector 110 may be disposed on one side of the actuator 160, and may be provided as a rotary encoder connected to the moving rail 173 to measure the rotation angle of the actuator 160 rotating according to the movement of the moving rail 173 as shown in FIG. 6. However, according to an exemplary embodiment, the detector 110 may be provided as a rotary encoder that is directly connected to the moving rail 173 and rotates according to the movement of the moving rail 173 and may be configured to measure the rotation angle of the rotor. At this time, the controller 130 may be configured to operate at least one actuator 160 that corresponds to the at least one axis to provide a force in a direction opposite to the movement direction of the at least one axis when at least one of the plurality of axes 171 moves based on physical force from the user.

In other words, the controller 130 may be configured to operate the actuator 160 to provide a force in a direction opposite to the direction of the force exerted by the user on the axis 171, thereby preventing the user from inadvertently moving the sudden axis 171 to rapidly change the speed. The controller 130 may be configured to operate the at least one actuator 160 that corresponds to the at least one axis so that when at least one of the plurality of axes 171 moves, the at least one axis returns to the reference position. The controller 130 may be configured to operate the actuator 160 such that each of the plurality of axes 171 returns to the reference position again when the plurality of axes 171 is moved based on the force from the user, the force from the user is no longer applied.

FIG. 7 is a diagram illustrating an example in the case where a personal mobility 10 according to an exemplary embodiment moves an axis in response to status information. The controller 130 may be configured to operate the actuator 160 such that each of the plurality of axes 171 moves to a position corresponding to state information. For example, in the state of the failure of the personal mobility 10 or the battery is disabled, the controller 130 may be configured to operate the actuator 160 such that the second axis 171-2 and the third axis 171-3 are gathered toward the first axis 171-2 in the left handle 17L and the right handle 17R, respectively.

In other words, the controller 130 may be configured to move the plurality of axes 171 to have a positional relationship corresponding to the status information, so that information may be transmitted to the user through shape modification of the handle 17. Modification of the shape of the handle 17 is not limited to the example of FIG. 7, and a plurality of shapes corresponding to a plurality of status information may be provided to the user. Through this, the user may receive information through the handle 17 even without staring at or viewing a separate display system thus decreasing the risk of accident occurrence.

Figure 8:
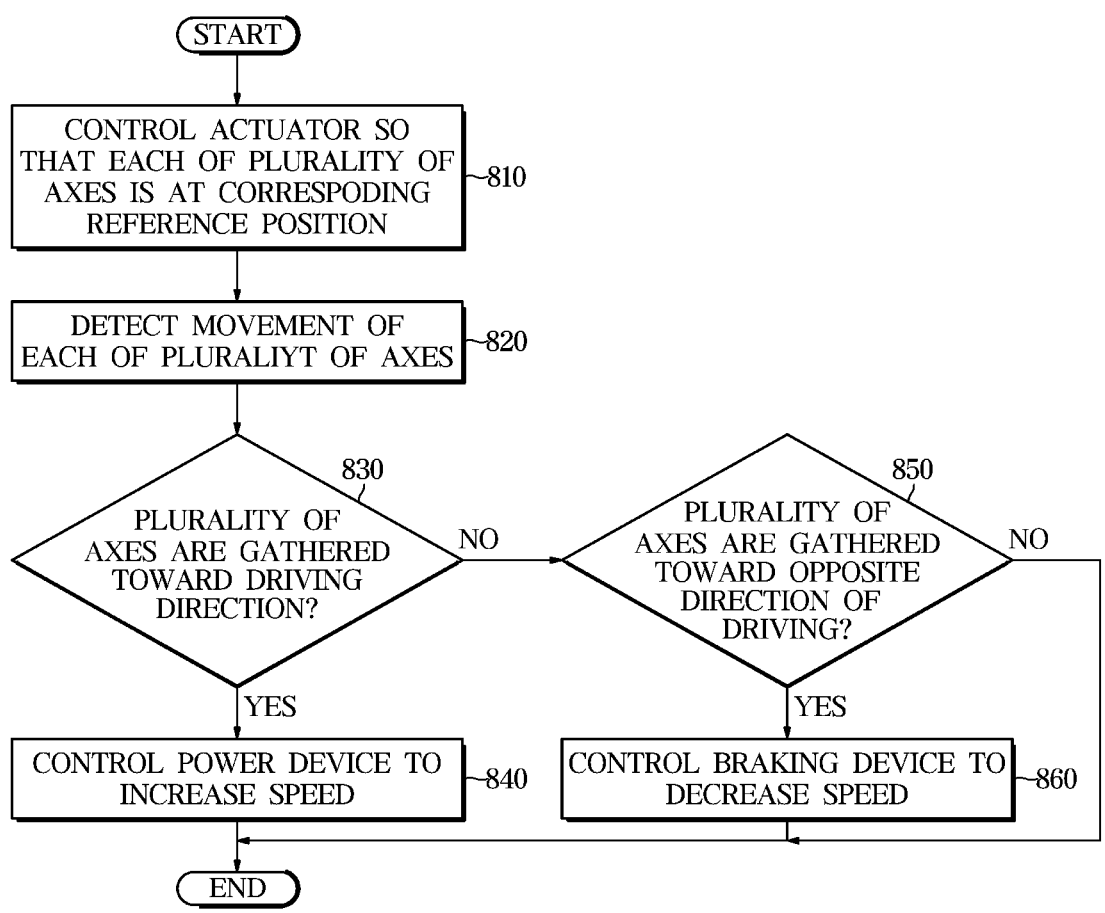
FIG. 8 is a flowchart illustrating a case in which speed is controlled based on a positional relationship between axes of a handle in a method for controlling personal mobility according to an exemplary embodiment.

FIG. 8 is a flowchart illustrating a case in which speed is adjusted based on a positional relationship between axes 171 of a handle 17 in a method for controlling personal mobility 10 according to an exemplary embodiment. Referring to FIG. 8, the personal mobility 10 according to an exemplary embodiment may be configured to operate the actuator 160 to position each of the plurality of axes 171 at a corresponding reference position (810).

The personal mobility 10 according to an exemplary embodiment may be configured to detect the movement of each of the plurality of axes 171 (820). In other words, the controller 130 may be configured to sense the movement of each of the plurality of axes 171 based on the output from the detector 110 corresponding to each of the plurality of axes 171. The personal mobility 10 according to an exemplary embodiment may be configured to operate the power device 140 to increase the speed when a plurality of axes 171 converge toward the driving direction (YES in 830), and operate the braking device 150 (860) to decrease the speed when the plurality of shafts 171 converge toward the opposite direction of the driving direction (YES in 850).

In other words, the controller 130 according to an exemplary embodiment may be configured to adjust the driving speed by operating the power device 140 or the braking device 150 based on the positional relationship between the plurality of axes 171 according to the movement of each of the plurality of axes 171. Specifically, when the plurality of axes 171 are moved toward the driving direction based on the central axis C in the long axis direction of the handle 17 according to the movement of each of the plurality of axes 171, the controller 130 may be configured to operate the power device 140 to increase the speed. In addition, the controller 130 may be configured to operate the braking device 150 to decrease the speed when a plurality of shafts 171 are gathered toward the opposite direction of the driving direction based on the central axis C in the long axis direction of the handle 17 according to the movement of each of the plurality of shafts 171

At this time, the controller 130 may be configured to determine the magnitude of acceleration in proportion to the degree of proximity between the plurality of axes 171 In other words, when a plurality of axes 171, which are regular polygons and located at a reference position apart from each other, are gathered by each other by the force transmitted from the user, the controller 130 may be configured to determine that the higher the degree of proximity, the greater the force received from the user, and determine magnitude of acceleration to be larger, and operate the power device 140 or the braking device 150 to increase or decrease the speed with the determined magnitude of acceleration.

On the other hand, the above-mentioned exemplary embodiments may be implemented in the form of a recording medium storing commands capable of being executed by a computer system. The commands may be stored in the form of program code. When the commands are executed by the processor, a program module is generated by the commands so that the operations of the disclosed exemplary embodiments may be carried out. The recording medium may be implemented as a non-transitory computer-readable recording medium.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

According to one aspect of personal mobility (personal mobility) and its control method, the speed may be adjusted based on the shape deformation of the handle, so that the user may adjust the speed in the situation where the handle is gripped, increasing the user's convenience and reducing the risk of accidents.

What is claimed is:

1. A personal mobility device, comprising:
   a power device;
   a braking device;
   a handle including a plurality of shafts provided to be movable and a deformable cover surrounding the plurality of shafts;
   a detector configured to detect movement of each of the plurality of shafts; and
   a controller configured to operate the power device and the braking device based on a positional relationship between the plurality of shafts according to the movement of each of the plurality of shafts.

2. The personal mobility device according to claim 1, wherein the controller is configured to operate the power device to increase a speed when the plurality of shafts gather toward a driving direction based on a central axis of the handle according to the movement of each of the plurality of shafts.

3. The personal mobility device according to claim 1, wherein the controller is configured to operate the braking device to decrease a speed when the plurality of shafts gather toward an opposite direction of a driving direction based on a central axis of the handle according to the movement of each of the plurality of shafts.

4. The personal mobility device according to claim 1, wherein the controller is configured to determine a magnitude of acceleration in proportion to a degree of proximity between the plurality of shafts.

5. The personal mobility device according to claim 1, wherein the handle includes a left handle and a right handle, and wherein the controller is configured to determine a first acceleration based on a positional relationship between the plurality of shafts in the left handle, determine a second acceleration based on the positional relationship between the plurality of shafts in the right handle, and operate the power device or the braking device based on a sum of the first acceleration and the second acceleration.

6. The personal mobility device according to claim 1 further comprising:
   a plurality of actuators corresponding to each of the plurality of shafts.

7. The personal mobility device according to claim 6, wherein the controller is configured to operate at least one actuator of the plurality of actuators corresponding to at least one of the plurality of shafts to provide a force in a direction opposite to the movement direction of the at least one of the plurality of shafts when the at least one of the plurality of shafts moves based on a physical force from the user.

8. The personal mobility device according to claim 6, wherein the controller is configured to operate at least one actuator of the plurality of actuators corresponding to at least one of the plurality of shafts to return the at least one of the plurality of shafts to a reference position when the at least one of the plurality of shafts moves.

9. The personal mobility device according to claim 6, wherein the controller is configured to operate the plurality of actuators to move the plurality of shafts to a position corresponding to state information.

10. The personal mobility device according to claim 6, wherein the handle includes a pair of support members that support the plurality of shafts and are provided with a plurality of moving rails corresponding to each of the plurality of shafts; and wherein each of the plurality of actuators are connected to a corresponding moving rail among the plurality of moving rails.

11. A control method of a personal mobility device including a power device, a braking device and a handle, the method comprising:
   detecting, by a controller, a movement of each of a plurality of shafts included in the handle and provided to be movable;
   operating, by the controller, the power device and the braking device based on a positional relationship between the plurality of shafts according to the movement of each of the plurality of shafts.

12. The method according to claim 11, wherein operating the power device or the braking device includes: operating the power device to increase a speed when the plurality of shafts gather toward a driving direction based on a central axis of the handle according to the movement of each of the plurality of shafts.

13. The method according to claim 11, wherein operating the power device or the braking device includes: operating the braking device to decrease a speed when the plurality of shafts gather toward an opposite direction of a driving direction based on a central axis of the handle according to the movement of each of the plurality of shafts.

14. The method according to claim 11, wherein operating the power device or the braking device includes: determining a magnitude of acceleration in proportion to a degree of proximity between the plurality of shafts.

15. The method according to claim 11, wherein the handle includes a left handle and a right handle, and the method further includes:
   determining, by the controller, a first acceleration based on a positional relationship between the plurality of shafts in the left handle;
   determining, by the controller, a second acceleration based on the positional relationship between the plurality of shafts in the right handle; and
   operating, by the controller, the power device or the braking device based on a sum of the first acceleration and the second acceleration.

16. The method according to claim 11, wherein the personal mobility device further includes a plurality of actuators corresponding to each of the plurality of shafts.

17. The method according to claim 16 further comprising:
   operating, by the controller, at least one actuator of the plurality of actuators corresponding to at least one of the plurality of shafts to provide a force in a direction opposite to the movement direction of the at least one of the plurality of shafts when the at least one of the plurality of shafts moves based on a physical force from the user.

18. The method according to claim 16 further comprising:
   operating, by the controller, at least one actuator of the plurality of actuators corresponding to at least one of the plurality of shafts to return the at least one of the plurality of shafts to a reference position when the at least one of the plurality of shafts moves.

19. The method according to claim 16 further comprising:
   operating, by the controller, the plurality of actuators to move the plurality of shafts to a position corresponding to state information.

20. The method according to claim 16, wherein the handle includes a pair of support members that support the plurality of shafts and are provided with a plurality of moving rails corresponding to each of the plurality of shafts; and wherein each of the plurality of actuators are connected to a corresponding moving rail among the plurality of moving rails.

* * * * *